United States Patent
AbiEzzi (10) Patent No.: US 10,581,950 B2
(45) Date of Patent: Mar. 3, 2020

(54) LOCAL OPERATION OF REMOTELY EXECUTED APPLICATIONS

(71) Applicant: VMware, Inc., Palo Alto, CA (US)

(72) Inventor: Salim AbiEzzi, Sammamish, WA (US)

(73) Assignee: VMware, Inc., Palo Alto, CA (US)

( * ) Notice: Subject to any disclaimer, the term of this patent is extended or adjusted under 35 U.S.C. 154(b) by 638 days.

(21) Appl. No.: 14/641,100

(22) Filed: Mar. 6, 2015

(65) Prior Publication Data
US 2016/0261671 A1    Sep. 8, 2016

(51) Int. Cl.
*G06F 3/048*   (2013.01)
*H04L 29/08*   (2006.01)
*G06F 9/451*   (2018.01)
*G06F 8/38*    (2018.01)

(52) U.S. Cl.
CPC .............. *H04L 67/025* (2013.01); *G06F 8/38* (2013.01); *G06F 9/452* (2018.02)

(58) Field of Classification Search
CPC ................................ H04L 67/025; G06F 8/71
See application file for complete search history.

(56) References Cited

U.S. PATENT DOCUMENTS

2009/0037523 A1* 2/2009 Kolke ............... G06F 17/30873
                                              709/203
2015/0188983 A1* 7/2015 Elias ........................ G06F 9/445
                                              726/4

* cited by examiner

*Primary Examiner* — Phuong H Nguyen
(74) *Attorney, Agent, or Firm* — Fish & Richardson P.C.

(57) ABSTRACT

Systems and techniques are described for executing an application locally. A described technique includes providing, by a user device and to a remote application system, data identifying user events associated with the application while data communication is available between a user device and a remote application system executing an application. The user device receives from the remote application system user interfaces for the application and presents the user interfaces on a display of the user device. The user events are provided as inputs to a local version of the application executing on the user device. A determination is made that data communication between the user device and the remote application system has become unavailable. In response, a user interface generated by the local version of the application is presented on the display of the user device.

20 Claims, 3 Drawing Sheets

LOCAL OPERATION OF REMOTELY EXECUTED APPLICATIONS

BACKGROUND

This document relates to executing applications locally and remotely.

A user of a user device can interact with an application that is executed on a server remote from the user device using a remote display protocol. The remote display protocol can be used to transfer the display data generated by the application for presentation on the user device and to transfer data identifying user input events from the user device to the application. During execution and based on user input events from the user device, the application can generate updates to the display data, and the remote display protocol can be used to transfer the updated display data to the remote client.

A virtual machine (VM) is a software-based abstraction of a physical computer system. A VM is executed on a physical computer through the use of virtualization software typically referred to as a "hypervisor." A physical computer system, also referred to as a host machine, can execute one or more VMs. The hypervisor is software that is logically interposed between and interfaces with a VM and a physical computer system. In general, each VM is configured to execute an operating system, referred to herein as a guest OS, and applications.

SUMMARY

In general, one aspect of the subject matter described in this document can be embodied in a technique that includes, while data communication is available between a user device and a remote application system executing an application: providing, by the user device and to the remote application system, data identifying user events associated with the application; receiving, by the user device and from the remote application system, user interfaces for the application and presenting the user interfaces on a display of the user device; and providing the user events as inputs to a local version of the application executing on the user device; and determining that data communication between the user device and the remote application system has become unavailable and, in response: presenting, on the display of the user device, a user interface generated by the local version of the application; detecting, by the user device, one or more subsequent user events associated with the user interface generated by the local version of the application; providing the subsequent user events as input to the local version of the application; and storing data identifying the one or more subsequent user events.

These and other aspects can optionally include one or more of the following features. Some implementations include determining that data communication between the user device and the remote application system has been reestablished and in response, providing the stored data to the remote application system.

Some implementations include determining that the application has synchronized with the local version of the application based, at least in part, on the application processing the one or more subsequent user events. The user device can detect a new user event associated with the application after the application has synchronized with the local application. Data identifying the new user event can be provided to the remote application system. A new user interface can be received from the remote application system. The new user interface can be presented on the display.

Some implementations include, while data communication is available between the user device and the remote application system, providing user interfaces generated by the local version of the application to an off-screen buffer. In some implementations, the application includes a respective user interface code path corresponding to each of a multitude of user device classes. Each user interface code path, when executed, can generate a user interface that is specific to user devices of the corresponding user device class.

In general, another aspect of the subject matter described in this specification can be embodied in a technique that includes receiving, at a remote application system and from a user device, data identifying a user event associated with an application managed by the remote application system; providing the user event as input to the application; providing, to the user device, a user interface generated by the application for presentation on the user device; determining that data communication with the user device has become unavailable; in response to determining that data communication with the user device has become unavailable, preventing other devices from writing to the application; determining that data communication with the user device has been reestablished; receiving, from the user device, data identifying user events associated with the application and that were detected by the user device while data communication was not available; causing the application to process the user events identified by the data; receiving a new user interface from the application; and providing the new user interface to the user device.

Some implementations include determining that the application is synchronized with a local version of the application executing on the user device; receiving, from the user device, data identifying a new user event; and providing the new user event as input to the application.

In some implementations, the application includes a respective user interface code path corresponding to each of a multitude of user device classes. Each user interface code path, when executed, can generate a user interface that is specific to user devices of the corresponding user device class.

Some implementations include receiving information characterizing the user device; classifying, using the information characterizing the user device, the user device into a particular user device class of the user device classes; and causing the application to generate user interfaces by executing a particular user interface code path corresponding to the particular user device class.

In general, another aspect of the subject matter described in this specification can be embodied in a technique that includes during a remote mode of operation for a remote application: providing, by a user device and to the remote application system, data identifying user events associated with a remote application managed by the remote application system; receiving, by the user device and from the remote application system, user interfaces for the remote application and presenting the user interfaces on a display of the user device; receiving a request to switch from the remote mode of operation to a local mode of operation for the remote application; and in response to receiving the request, switching to the local mode of operation and synchronizing a local version of the application with the remote application, the local version of the application being executed by the user device; and during the local mode of operation: presenting, on the display of the user device, a user interface generated by the local version of the application.

Some implementations include, during the local mode of operation, detecting, by the user device, one or more subsequent user events associated with the user interface generated by the local version of the application; providing the one or more subsequent user events as input to the local version of the application; and storing data identifying the one or more subsequent user events.

Some implementations include presenting, on the display of the user device, a user interface generated by the local version of the application for each of the one or more subsequent user events. Some implementations include receiving a request to switch from the local mode of operation to the remote mode of operation for the remote application and, in response to receiving the request, switching to the remote mode of operation and synchronizing the remote application with the local version of the application. Synchronizing the remote application with the local version of the application can include providing, by the user device and to the remote application system, the data identifying the one or more subsequent user events. The remote application system can cause the remote application to process the one or more subsequent user events.

Some implementations include, during the remote mode of operation, causing the local version of the application to process user events detected by the user device and providing user interfaces generated by the local version of the application in response to the user events to an off screen buffer of the user device.

Particular embodiments of the subject matter described in this document can be implemented so as to realize one or more of the following advantages. By executing an application on a user device in parallel with remote execution of the application (e.g., by a remote application system), execution of the application can be maintained in the event of an interruption in data communication between the user device and the remotely executed application. By storing and providing to the remote application system data identifying user events received and processed by the local application during the communication interruption, the remotely executed application can be synchronized with the local application upon a re-establishment of the communication.

Executing an application locally in parallel with the remote application improves the user experience by allowing the user to continue interacting with an application seamlessly during communication interruptions or degradation in server performance, e.g., server slow down. The parallel execution can also improve the functionality of the user device and the remote application system by allowing the user device and the remote application system to quickly synchronize application states and data without service interruption to the user nor explicit actions by the user. Continuing the execution of the application in local mode allows the application to be available to the user for extended time periods, e.g., while network connectivity is not available.

By executing an application remotely when data communication is available, but locally at the user device when data communication is not available, the user normally has access to all of the data used by the remote application while having limited access to only data at the user device when data communication is not available. In addition, having the application primarily executed at a remote location allows for seamless access to the application from multiple devices.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for local operation of an application that is normally executed remotely. A described technique includes providing, by a user device and to a remote application system, data identifying user events associated with the application while data communication is available between a user device and a remote application system executing an application. The user device receives from the remote application system user interfaces for the application and presents the user interfaces on a display of the user device. The user events are provided as inputs to a local version of the application executing on the user device. A determination is made that data communication between the user device and the remote application system has become unavailable. In response, a user interface generated by the local version of the application is presented on the display of the user device. The user device detects one or more subsequent user events associated with the user interface generated by the local version of the application. The subsequent user events are provided as input to the local version of the application. Data identifying the one or more subsequent user events are stored.

Figure 1:
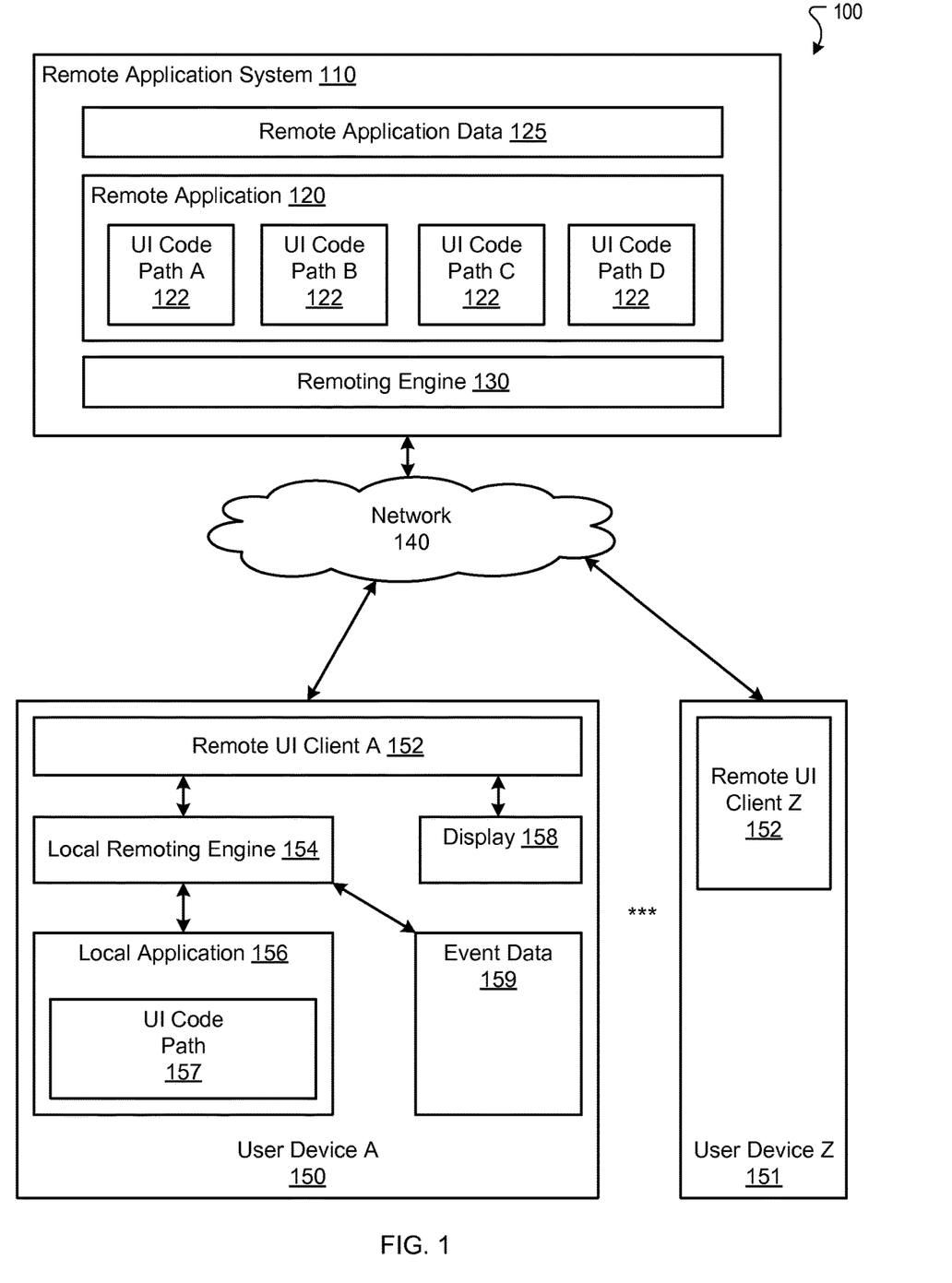
FIG. 1 shows an example environment in which a remote application system and a user device execute an application.

FIG. 1 shows an example environment 100 in which a remote application system 110 and a user device 150 execute an application. The remote application system 110 is an example of a system implemented as computer programs on one or more computers in one or more locations, in which the systems, components, and techniques described below are implemented.

The remote application system 110 manages the execution of one or more applications and allows users of user devices, e.g., the user device 150 and/or user device 151, remote from the remote application system 110 to access and interact with the applications managed by the remote application system 110 by providing user interfaces generated by the applications for presentation on the user devices over a network 140. The network 140 can be, e.g., a local area network (LAN), wide area network (WAN), e.g., the Internet, a cellular data network, or a combination thereof. The network 140 provides data communication between the user device 150 and the remote application system 110.

In order to allow the users to interact with the remote applications managed by the remote application system 110, the remote application system 110 also receives data identifying user events associated with the presented user interfaces and transmits those user events to the applications executing on the remote application system 110. For example, the remote application system 110 can allow a user of user device 150 to access and interact with a remote application 120 executing on the remote application system 110.

The user device 150 can be one of various user computers that have various display properties and that accept various user input modalities. For example, the user device 150 can be a mobile device, e.g., a smartphone or tablet computer, that accepts touch input. Displays of mobile devices can be of varying sizes and can display outputs at various display resolutions. The user device 150 can also be a desktop or laptop computer that accepts keyboard and mouse input, a network-connected television that accepts user input using various types of remote controls, a video game console, and so on. Example components of the user device 150 are described in more detail below.

In some implementations, to account for the different display and input capabilities of different kinds of user devices, the remote application 120 can include multiple user interface code paths 122. Each of the user interface code paths 122, when executed, generates and manages a user interface that is specific to a respective class of user devices. For example, one of the user interface code paths 122 may generate a user interface for user devices that accept touch input, that have displays of specified sizes, and that display output at a specified range of resolutions. A different one of the user interface code paths 122 may generate a user interface for user devices that accept keyboard and mouse input. In some implementations, the remote application 120 provides user interfaces that can be presented on various types of user devices having various display types and various inputs, without the use of user interface code paths 122.

In order to allow a user to interact with applications managed by the remote application system 110, the user device 150 includes a remote user interface client 152 that users of the user device 150 can use to interact with the remote application 120 or with other applications executing on the remote application system 110. In some implementations, the remote user interface client 152 is a special purpose process executing on the user device 150. In some other implementations, the remote user interface client 152 is a web browser executing on the user device 150.

In particular, a user of the user device 150 can submit a request to the remote application system 110 through the remote user interface client 152 executing on the user device 150 to access the remote application 120. A remoting engine 130 in the remote application system 110 receives the request from the remote user interface client 152 to access the remote application 120 and causes the remote application 120 to generate a user interface.

In implementations in which the remote application 120 includes multiple user interface code paths 122 that are each specific to a respective user device class, the remoting engine 130 can determine the device class to which the requesting user device belongs and execute the user interface code path 122 corresponding to the device class to generate the user interface. The remoting engine 130 can determine the device class for the user device 150 based on information that characterizes the user device 150. For example, the information characterizing the user device 150 may be sent to the remote application system 110 (e.g., by the remote user interface client 152) with a request to access the remote application 120. The information characterizing the user device 150 can include the device type of the user device 150, e.g., mobile phone, tablet, laptop computer, television and so on, and the input styles accepted by the user device 150, e.g., touch input, mouse input, keyboard input, infrared (IR) remote, and so on. The identifying information can also include information characterizing the display of the user device 150, e.g., the size of the display, e.g., the x and y dimensions of the display (e.g., in inches), and the resolution of the display, e.g., pixels per inch. The remoting engine 130 can then determine a device class for which the user device 150 satisfies the criteria, e.g., the device type criteria, the display type criteria, or the input style criteria, based on the information characterizing the user device 150.

The remoting engine 130 provides the user interface generated by the remote application 120 to the requesting user device 150 for presentation to the user by the remote user interface client 152 executing on the user device 150. Generally, the remoting engine 130 transmits the user interface data to the remote user interface client 152 executing on the user device 150 using a remote display protocol. In some implementations, the remote display protocol is a pixel-level protocol e.g., the Blast protocol or the remote desktop protocol (RDP), that compresses, encrypts and transports image pixels to the remote user interface client 152 executing on the user device 150. The remote user interface client 152 in turn causes the user device 150 to decrypt, decompress, and display the image pixels. In some other implementations, the remoting engine 130 can provide the user interface data using a higher-level protocol. For example, the higher-level protocol may be a protocol that provides the user interface data using a page layout language with client-side scripting, e.g., a protocol that provides the user interface data in a hypertext markup language (HTML) document with Cascading Style Sheets (CSS) and JavaScript. As another example, the higher-level protocol may be a geometry-based protocol, e.g., a graphics device interface (GDI) protocol.

While the user interface is being displayed to the user, the remote user interface client 152 is configured to detect user events associated with the displayed user interface and provide data identifying the user events to the remoting engine 130. For example, the remote user interface client 152 can detect user events, e.g., a click or touch input on the user interface or a text input submitted by a user while the user interface is active on the user device, and provide data identifying the user events to the remoting engine 130, e.g., data identifying the location of the user event, the type of the user event, and other user event parameters.

Once the remoting engine 130 receives data identifying a user event, the remoting engine 130 provides the data as input to the remote application 120. If the user input causes a change to the user interface, the remoting engine 130 receives the updated user interface data from the remote application 120 and provides the updated user interface data for presentation to the user by the remote user interface client 152, e.g., using the remote display protocol.

While executing the remote application 120, the remote application system 110 can store data regarding the remote application 120 in a remote application data store 125. For example, the stored data may include data files, application personalization, user interfaces generated in response to the user events, data received from the user device, e.g., images, video, text input, and so on, and/or data generated or modified during execution of the remote application 120. These stored data can be based on user events received from the user device 150.

The user device 150 can also execute a local version 156 of the remote application 120. The local application 156 can be executed in parallel with the remotely executing remote application 120 so that the user can continue interacting with the application in the event that data communication between the user device 150 and the remote application system 110 is interrupted. The local application 156 can be the same as the remote application 120, e.g., if the application runtime is compatible at both the remote application system 110 and the user device 150. For example, if the remote application system 110 and the user device 150 both have x86 architectures, the same application may be executed by both the remote application system 110 and the user device 150 to provide a common runtime environment. Alternatively, the remote application system 110 may have an x86 processor, while the user device 150 has a different processor, e.g., an ARM processor. In this example, both the remote application 120 and the local application 156 may be based on a common runtime, e.g., a VM, byte-code, and libraries, supported by the remote application system's processor(s) and the user device's processor(s). In some implementations, the user device 150 may have a different architecture and execute a different version of the application 120. In such implementations, the local application 156 may be adapted to provide the same, or at least a subset of, the functionality of the remote application 120. The local application 156 and the remote application 120 can provide the same functionality, e.g., behave identically, with respect to generating user interfaces and handling user events.

As the data storage capabilities of the user devices may be limited, a proper subset of the application data 125 may be stored at the user device 150. This subset of data may be selected by the remote application 120 or by the user. For example, the application data 125 may be stored at the user device 150 based on temporal characteristics of the data, e.g., store more recent data at the user device 150 while older data is stored at the remote application system 110 exclusively, and/or based on the relevancy of the data, e.g., data accessed more often may be stored at the user device 150. In another example, a user may specify a prioritization scheme for the locally stored data and the remote application system 110 may determine which data to store locally at the user device 150 based on the prioritization scheme, the device's settings, and/or the device's data capacity.

In some implementations, during a remote mode of operation for the remote application 120, the local application 156 and the remote application 120 both process user events detected by the remote user interface client 152. For example, the remote user interface client 152 can provide data identifying the user events to both applications 120 and 156. In a particular example, the remote user interface client 152 may provide identical network packets (e.g., IP packets) to a local remoting engine 154 and to the local application 156. While data communication between the remote application system 110 and the user device 150 is established, the user device 150 may present user interfaces generated and provided by the remotely executed remote application 120 on its display 158 and not present any user interfaces generated by the local application 156. For example, the user interfaces generated by the local application 156 while data communication is established may be provided to one or more off-screen buffers, e.g., of the user device 150, rather than to the display 158. This allows for quick and seamless transition to local mode where the local application 156 provides user interfaces for display by the user device 150, as described below.

If data communication between the remote application system 110 and the user device 150 is interrupted, e.g., because the user device 150 cannot connect to the network 140 due to a network failure, the user device 150 passes into an area with no connectivity to the network 140, or the user device 150 is placed into an offline or airplane mode, the remote application 120 and the local application 156 may be placed into a local mode of operation. In local mode, the user interfaces generated by the local application 156 may be presented by the display 158. Also in local mode, limited or no access to the remote application 120 may be provided to other devices. For example, other devices may have read only access to the remote application 120 while the remote application 120 is in local mode on the user device 150.

In some implementations, the remote user interface client 152 may detect the loss of communication and, in response to detecting the loss of communication, place the local application 156 in local mode and begin forwarding user interfaces generated by the local application 156 to the display 158, i.e., in place of user interface generated by the remote application system 110. In addition, the remote user interface client 152 may store data identifying user events detected while communication is interrupted in an event data store 159. For example, the data may include, for each user event, the data that would normally be forwarded to the remote application system 110. The data may also include a time stamp specifying the time and date at which the user event was detected and/or the remote user interface client 152 may store the data in a sequence based on the sequence in which the user events were detected. In this way, the remote user interface client 152 may provide the user event data to the remote application system 110 after communication is restored for processing into the off-screen buffer by the remote application 120 in the same order as the user events were generated in order to synchronize the two applications 120 and 156 and their data. Once the synchronization is complete, the remote application system 152 may return to providing the user interfaces generated by the remote application 120 to the display 158 for presentation to the user. For example, the remoting engine 130 may determine that the remote application 120 has synchronized with the application 156 when the remote application 120 has processed all of the user events identified in the user event data and any new event data received while the user event data was being processed. In response to the notification, the remote user interface client 152 may return to remote mode. In some implementations, the remote user interface client 152 may ensure that the data communication is steady before returning to remote mode. For example, the remote user interface client 152 may wait until data communication has been available for at least a threshold amount of time before returning to remote mode.

In some implementations, the local application 156 includes a user interface code path 157. Like the user interface code paths 122, the user interface code path 157 may, when executed, generate a user interface that is specific to a respective class of user devices. In some implementations, the local application 156 includes only the user interface code path that corresponds to the class of user device to which the user device 150 belongs. For example, during installation of the local application 156, the remote user interface client 152 or the local remoting engine 130 may classify the user device 150 into an appropriate device class, e.g., based on information characterizing the user device 150, and cause the application 152 to install the user interface code path for the user device's device class.

During local and remote modes of operation, the local application 156 can process user events that are detected by the remote user interface client 152 and provided to the local application 156 by way of the local remoting engine 154, generate user interfaces based on the user events, and provide the user interfaces to the local remoting engine 154, which in turn provides the user interfaces to the remote user interface client 152. In local mode, e.g., when data communication between the remote application system 110 and the user device 150 is not available, the remote user interface client 152 may cause the display 158 to present the user interfaces received from the local application 156. Also during local mode, the remote user interface client 152, or the local remoting engine 154, stores data identifying user events received while data communication is not available in the event data store 159. In remote mode, e.g., when data communication is established with the remote application system 110, the remote user interface client 152 may receive user interfaces generated by the remote application system 110 and cause the display 158 to present the user interfaces.

In some implementations, the user may be allowed to determine when to switch to local mode such that the user is interacting with user interfaces generated by the local application 156. For example, the user may be planning to be in a place where network access is not available for an extended period of time, e.g., on a cruise ship or in an airplane. In this example, the application data 125 may be synchronized to the user device 150, e.g., in response to a request from the user by way of the user device 150. In addition, the remotely executed remote application 120 may be placed in a paused state until a request to return to remote mode is received. For example, when the user returns to a location with access to the network 140, the user may submit a request, e.g., using the remote user interface client 152, to return to remote mode. In response, the remote user interface client 152 may submit the request along with user event data stored in the event data store 159 to the remoting engine 130. The remote application 120 may receive the user event data from the remoting engine 130, process the user event data to synchronize state and files of the remote application 120 with the state and files of the local application 156, and return to providing user interfaces to the remote user interface client 152 based on user events.

Some users may access the same application from multiple devices. For example, a user may access photos managed by an application executing on the remote application system 110 using a tablet and a smartphone. When an application is being accessed by a user in local mode using a first device, it may be beneficial to ensure that the remote application 120 is not accessed, or at least not written to, by a second device. In some implementations, the remoting engine 130 may detect that data communication is not available and, in response, make the remote application 120 inaccessible or place the application 120 in a read-only mode. In some implementations, the first device may notify the remoting engine 130 once data communication becomes available and, in response to the notification, the remoting engine 130 may make the remote application 120 inaccessible or read-only to other devices until the remote application 120 has processed user event data received from the first device and had synchronized with the application executing on the first device.

By remotely executing the remote application 120 remote from the user device 150, the user can access the remote application 120 from multiple devices seamlessly. In addition, by allowing the user device 150 to execute a local version of the application locally, e.g., when data communication is not available, the user can still use the application, but possibly with access to less than all of the application's data. The local application 156 can also be updated, e.g., software updates, during remote mode seamlessly, e.g., without user involvement. Development and life-cycle management of the local application 156 can be handled automatically as part of the remote application 120, e.g., by the development tools.

Figure 2:
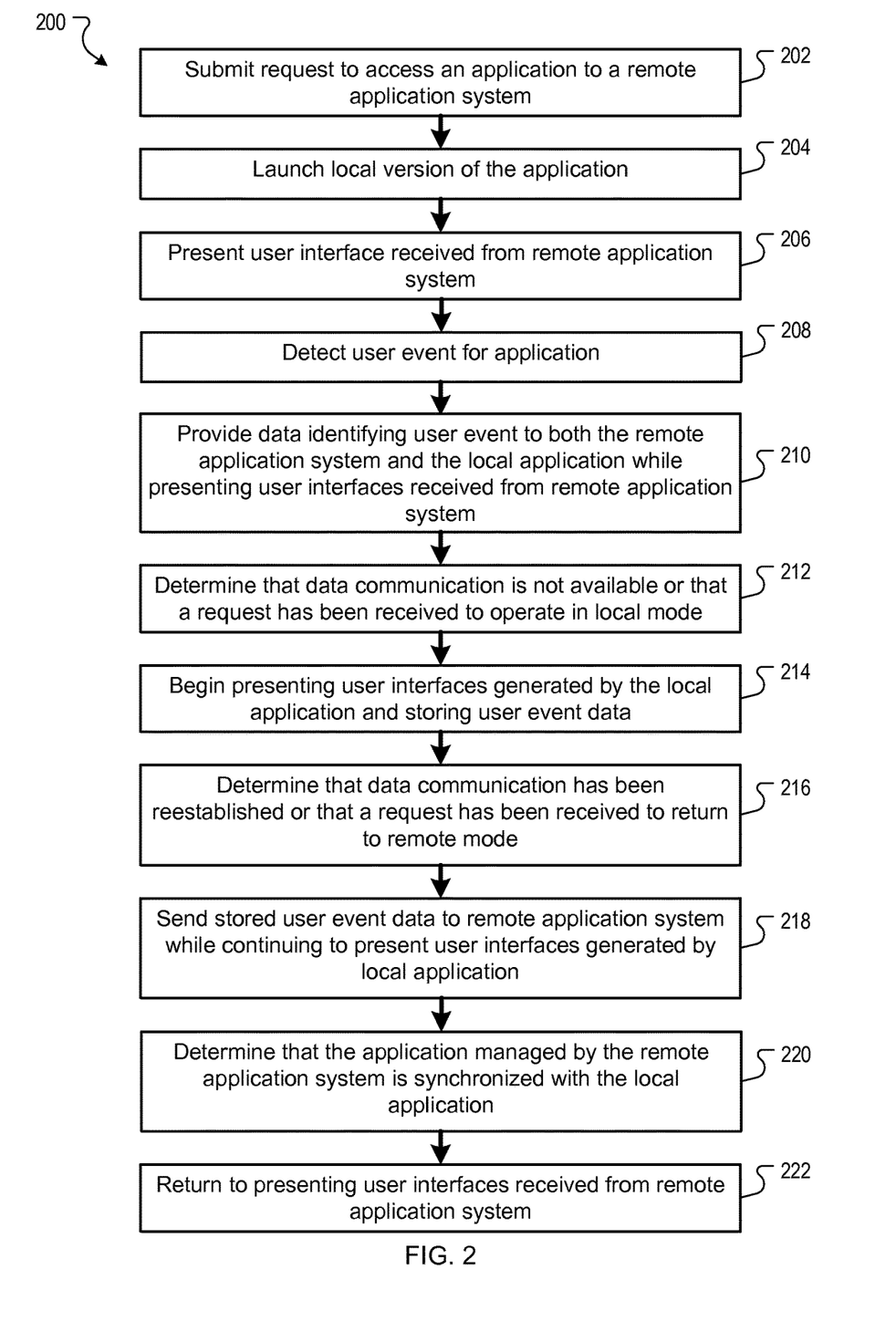
FIG. 2 is a flow chart of an example technique for displaying user interfaces generated by a local application and a remote application.

FIG. 2 is a flow chart of an example technique 200 for displaying user interfaces generated by a local application and a remote application. The example technique 200 is performed by a user device interacting with a remote application system. For example, the technique 200 may be performed by the user device 150 of FIG. 1 interacting with the remote application system 100 of FIG. 1.

The user device submits a request to access a remote application to a remote application system (202). The remote application system may manage the execution of the remote application remotely from the user device.

The user device launches a local version of the application (204). For example, as described above, a local version of the application may be executed in parallel with the remote application.

The user device presents a user interface received from the remote application system (206). For example, the remote application system may cause the remote application to generate a user interface in response to the request to access the remote application. The remote application system can then provide the generated user interface to the user device for presentation. In turn, the user device can present the user interface on a display of the system.

In addition, the local application executing on the user device may generate a user interface when the local application is launched. However, the user device may send this user interface to an off-screen buffer rather than presenting it on the display so that the user interface received from the remote application system can be presented. The user interface in the off-screen buffer is used to interpret user input events, e.g., a menu selection or a scroll bar move, and adjust the user interface accordingly.

The user device detects a user event associated with the remote application (208). For example, the user may interact with the presented user interface, e.g., by making a selection or providing text, image, voice, or video input. The system may detect the interaction as a user event for the application.

The user device provides data identifying the detected user event to the remote application system and to the local application (210). If the user event causes a change in the user interface, the remote application system may provide updated user interface data to the user device and the user device can display the updated user interface on the display.

The local application may also generate a user interface based on the user event. Although these user interfaces will match, the user device may present the user interfaces received from the remote application system rather than the user interfaces generated by the local application while data communication with the remote application system is available.

The user device determines that data communication between the system and the remote application system is not available or that a request has been received to operate in local mode (212). For example, data communication may not be available due to a network failure, due to the user device being placed in an airplane mode, due to network connectivity being disabled at the user device, or due to some other reason that prevents data communication between the user device and the remote application system. Or, the user may make a selection to operate the remote application in local mode such that user interfaces generated by the local application are presented. For example, the user may anticipate an interruption in network connectivity or unreliable network access.

In response to the interruption in data communication or the request to operate in local mode, the user device begins presenting user interfaces generated by the local application (214). For example, the user device may present a user interface generated by the local application based on each detected user event.

In addition, the user device may store data identifying each user event detected while the locally generated user interfaces are being presented. As described above, this data may be stored with timestamps specifying the time at which the user events were detected so that, once network connectivity is restored or local mode is deselected, the user events can be processed by the remote application in the sequence in which they were detected.

The user device determines that data communication between the system and the remote application system has been reestablished or that a request has been received to return to remote mode from local mode (216). For example, the user device may periodically attempt to establish data communication with the remote application system. If the user device successfully establishes the data communication, e.g., for at least a threshold amount of time, the user device may determine that data communication has been reestablished. Or, the user may make a selection to return to remote mode from local mode.

The user device sends the stored user event data to the remote application system (218). In addition, the user device continues presenting user interfaces generated by the local application based on detected user events. For example, until remote application is synchronized with the local application, the user device may continue presenting user interfaces generated by the local application. In addition, the user device may send to the remote application system user events detected while continuing to present the user interfaces generated by the local application. As described in more detail below, the remote application system causes the remotely executed application to process the user events identified in the stored user event data to synchronize with the local application.

The system determines that the remote application has synchronized with the local application (220). For example, once all of the user events stored in the user event data, and any new user events received during the processing of the stored user event data by the remote application system, have been processed by the remote application, the remote application system may send to the user device a notification that the user events have been processed. In another example, the remote application system may send a user interface for each user event identified in the user event data. The user device may then determine that the remotely executed application is synchronized in response to receiving a user interface for each of the user events.

The user device returns to presenting user interfaces received from the remote application system (222). For example, the user device may return to presenting user interfaces received from the remote application system in response to user events detected after the remote application has synchronized with the local application. In addition, the local application may continue generating user interfaces based on the user events. The user device may return to sending the user interfaces generated by the local application to the off-screen buffer.

In some implementations, during remote mode where the user device presents user interfaces received from the remote application system, the local application may not execute in parallel with the remote application. For example, if the user selects between local and remote mode, the local application may be paused or otherwise not actively generate user interfaces during remote mode. When the user selects local mode, the user device may send a request to the remote application system for the current state of the remote application. For example, remote application may store data related to the state of the application in a remote application data store. The user device can obtain this data from the remote application system and use the data to launch the local application in the current state of the remote application.

Figure 3:
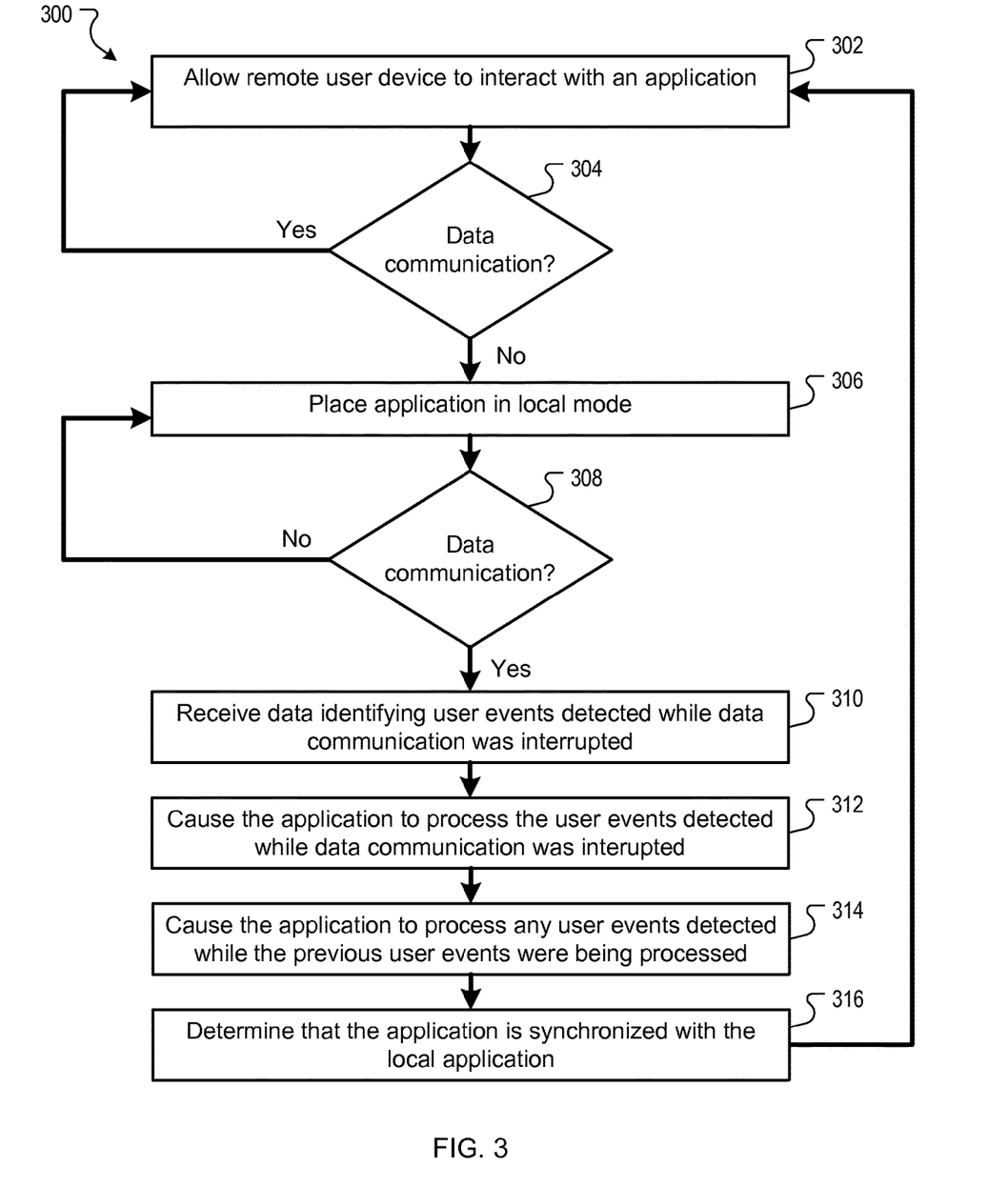
FIG. 3 is a flow chart of an example technique for providing user interfaces generated by an application to a remote device.

FIG. 3 is a flow chart of an example technique 300 for providing user interfaces generated by an application to a remote device. The example technique 300 is performed by a system of one or more computers. For example, the technique 300 may be performed by the remote application system 110 of FIG. 1.

The system allows a remote user device to interact with a remote application managed by the system (302). In particular, the system provides user interfaces generated by the remote application for presentation on the user device, receives data identifying user events associated with the presented user interfaces from the user device, and provides the received user events as input to the application.

The system determines whether data communication with the user device is available (304). If data communication is available, the system continues allowing the user device to interact with the remote application.

If the system determines that data communication with the user device has been interrupted, the system may place the application in a local mode (306). For example, the system may pause the remote application until data communication with the user device has been reestablished. While the application is paused, the system may prevent access to the application. In another example, during local mode, the application executing on the user device may continue to execute and provide functionality to the user, as described above. In addition, the remote application may allow certain levels of access, e.g., read-only access, to the remote application from other devices. If the user attempts to access the application using another device while the application is in local mode, the system may provide a message stating that the application is currently being accessed on another device in local mode. In local mode, the user device that has full local mode access to the application, e.g., the application that will eventually synchronize with the remote application, may be selected by the user or may be the first application to connect with the remote application after data communication is reestablished.

The system monitors for data communication to be reestablished with the user device (308). If data communication has not been reestablished, the system maintains the application in the paused state or in local mode.

If data communication has been reestablished, the system receives data identifying user events for the remote application that were detected while data communication was not available (310). For example, a local version of the remote application executing on the user device may have continued processing the user events and providing user interfaces for presentation to the user while data communication between the system and the user device was not available. The user device can also store data identifying the user events detected while data communication was not available and provide this data to the system when data communication is reestablished.

In some implementations, the user device provides the user events to the system in the order in which the user events were detected. In this way, the remote application can process the user events in order and correlate each user event to the proper user interface that was presented when the user event was detected. For example, after each user event, a new or adjusted user interface may be presented to the user. If the user events are processed out of order, then a user event may be attributed to an improper user interface causing an error or incorrect action. In some implementations, the data identifying the user events received by the system includes a timestamp for each user event and the system uses the timestamps to provide the user events to the remote application in the order in which the user events were detected by the user device.

The system causes the remote application to process each user event in the order in which the user events were detected (312). For example, the system can provide a first user event as input to the remote application. After the remote application has processed the first user event and output a user interface based on the user event, the system can provide a second user event that followed, e.g., immediately followed, the first user event, as an input to the application. This process can continue until each user event that was detected while data communication was interrupted has been processed.

The system causes the remote application to process any user events for the remote application that were detected by the user device while the application was processing the previous events (314). For example, while the remote application is processing the user events that were detected while data communication was interrupted, one or more new user events may be detected at the user device. The user device can cause the local application to process these new user events and present user interfaces generated by the local application based on the new user events. The user device can also provide data identifying the new user events to the system and the system can cause the remote application to process the new user events in the order in which the new user events were detected by the user device.

The system determines that the remote application is synchronized with the local application (316). For example, the system may determine that the remote application is synchronized with the local application when the remote application has processed the user events detected while data communication was interrupted and any new user events detected while the remote application was processing the previous user events. That is, the system may determine that the remote application is synchronized with the local application when both applications have processed the same user events. Once the remote application is synchronized with the local application, the system can then return to receiving data identifying new user events detected at the user device and providing to the user device user interfaces generated by the remote application in response to the user events. For example, the system and user device may return to a remote mode for the remote application.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   while data communication is available between a remote application system executing an application and a user device executing a local version of the application concurrently in parallel, and in response to detecting user events in response to respective user interactions with a user interface for the application presented by a remote user interface client:
   providing, by the user device and to the remote application system, data identifying the user events;
   providing the user events as inputs to the local version of the application executing on the user device, wherein the local version of the application generates first user interfaces based on the user events but the user device does not present the first user interfaces on a display of the user device;
   receiving, by the user device and from the remote application system, user interface data that represents second user interfaces for the application, the second user interfaces being generated by the application executed by the remote application system based on the user events; and
   presenting, on the display of the user device, the second user interfaces generated by the application executed by the remote application system rather than the first user interfaces generated by the local version of the application based on data communication being available between the user device and the remote application system; and determining that data communication between the user device and the remote application system has become unavailable and, in response:

detecting, by the user device, one or more subsequent user events associated with the application;

providing the subsequent user events as input to the local version of the application;

presenting, on the display of the user device, a subsequent user interface generated by the local version of the application based on at least one of the subsequent user events; and storing data identifying the one or more subsequent user events.

2. The method of claim 1, further comprising:

determining that data communication between the user device and the remote application system has been reestablished; and in response, providing the stored data to the remote application system, wherein the application executed by the remote application system processes the user events in an order in which the user events occurred until the application executed by the remote application system is synchronized with the local version of the application.

3. The method of claim 2, further comprising:

determining that the application executed by the remote application system has synchronized with the local version of the application based, at least in part, on the application processing the one or more subsequent user events;

detecting, by the user device, a new user event associated with the application after the application has synchronized with the local application;

providing, to the remote application system, data identifying the new user event;

receiving, from the remote application system, new user interface data representing a new user interface generated by the application executed by the remote application based on the new user event; and presenting the new user interface on the display.

4. The method of claim 1, further comprising, while data communication is available between the user device and the remote application system, providing the first user interfaces generated by the local version of the application to an off-screen buffer rather than presenting the first user interfaces on the display of the user device.

5. The method of claim 1, wherein the application comprises a respective user interface code path corresponding to each of a plurality of user device classes, and wherein each user interface code path, when executed, generates a user interface that is specific to user devices of the corresponding user device class.

6. A method comprising:

receiving, at a remote application system and from a user device, data identifying a user event associated with an application managed by the remote application system;

providing the user event as input to the application;

providing, to the user device, a user interface data generated by the application and that represents a user interface for presentation on the user device, wherein the user interface data includes, for the user interface, at least one of (i) pixel data representing pixels of the user interface or (ii) a document that describes presentation of the user interface;

determining that data communication with the user device has become unavailable;

in response to determining that data communication with the user device has become unavailable, preventing other devices of the user different from the user device from writing to the application managed by the remote application system until the communication with the user device is reestablished and the application managed by the remote application system has synchronized with a local version of the application executing on the user device, wherein the application managed by the remote application system has at least one of (i) access to more application data than the local version of the application executing on the user device or (ii) more functionality than the local version of the application executing on the user device;

determining that data communication with the user device has been reestablished;

receiving, from the user device, data identifying additional user events associated with the application and that were detected by the user device while data communication was not available;

synchronizing the application managed by the remote application system with the local version of the application by causing the application managed by the remote application system to process the additional user events;

receiving a new user interface from the application managed by the remote application system; and providing the new user interface to the user device.

7. The method of claim 6, further comprising:

determining that the application is synchronized with a local version of the application executing on the user device;

receiving, from the user device, data identifying a new user event; and providing the new user event as input to the application.

8. The method of claim 6, wherein the application comprises a respective user interface code path corresponding to each of a plurality of user device classes, and wherein each user interface code path, when executed, generates a user interface that is specific to user devices of the corresponding user device class.

9. The method of claim 8, further comprising:

receiving information characterizing the user device;

classifying, using the information characterizing the user device, the user device into a particular user device class of the plurality of user device classes; and causing the application to generate user interfaces by executing a particular user interface code path corresponding to the particular user device class.

10. A method comprising:

during a remote mode of operation for a remote application managed by a remote application system executing concurrently in parallel with a local version of the remote application on a user device, and in response to detecting user events in response to respective user interactions with a user interface for the application presented by a remote user interface client:

providing, by the user device and to the remote application system, data identifying the user events;

providing the user events as inputs to the local version of the remote application executing on the user device, wherein the local version of the remote application generates first user interfaces based on the user events but the user device does not present the first user interfaces on a display of the user device;
receiving, by the user device and from the remote application system, user interface data that represents second user interfaces for the remote application, the second user interfaces being generated by the remote application based on the user events;
presenting, on the display of the user device, the second user interfaces generated by the remote application managed by the remote application system rather than the first user interfaces generated by the local version of the remote application based on the remote application being in the remote mode of operation;
receiving a request to switch from the remote mode of operation to a local mode of operation for the remote application; and
in response to receiving the request, switching to the local mode of operation and synchronizing a local version of the remote application with the remote application, the local version of the remote application being executed by the user device; and
during the local mode of operation:
presenting, on the display of the user device, a user interface generated by the local version of the remote application.

11. The method of claim 10, further comprising:
during the local mode of operation:
detecting, by the user device, one or more subsequent user events associated with the user interface generated by the local version of the remote application;
providing the one or more subsequent user events as input to the local version of the remote application; and
storing data identifying the one or more subsequent user events.

12. The method of claim 11, further comprising presenting, on the display of the user device, a user interface generated by the local version of the remote application for each of the one or more subsequent user events.

13. The method of claim 11, further comprising:
receiving a request to switch from the local mode of operation to the remote mode of operation for the remote application; and
in response to receiving the request, switching to the remote mode of operation and synchronizing the remote application managed by the remote application system with the local version of the remote application.

14. The method of claim 12, wherein synchronizing the remote application managed by the remote application system with the local version of the remote application comprises providing, by the user device and to the remote application system, the data identifying the one or more subsequent user events, wherein the remote application system causes the remote application to process the one or more subsequent user events in an order in which the subsequent user events occurred.

15. The method of claim 10, further comprising, during the remote mode of operation, providing the first user interfaces generated by the local version of the application in response to the user events to an off screen buffer of the user device rather than presenting the first user interfaces on the display of the user device.

16. A system, comprising:
a display;
a data processing apparatus; and
a memory apparatus in data communication with the data processing apparatus and storing instructions executable by the data processing apparatus and that upon such execution cause the data processing apparatus to perform operations comprising:
while data communication is available between a remote application system executing an application and the data processing apparatus concurrently executing a local version of the application, and in response to detecting user events in response to respective user interactions with a user interface for the application presented by a remote user interface client:
providing, to the remote application system, data identifying the user events;
providing the user events as inputs to the local version of the application executing on the data processing apparatus, wherein the local version of the application generates first user interfaces based on the user events but the user device does not present the first user interfaces on the display;
receiving, from the remote application system, user interface data that represents second user interfaces for the application, the second user interfaces being generated by the application executed by the remote application system based on the user events; and
presenting, on the display, the second user interfaces generated by the application executed by the remote application system rather than the first user interfaces generated by the local version of the application executing on the data processing apparatus based on data communication being available between the data processing apparatus and the remote application system; and
determining that data communication between the data processing apparatus and the remote application system has become unavailable and, in response:
detecting one or more subsequent user events associated with the application;
providing the subsequent user events as input to the local version of the application;
presenting, on the display, a subsequent user interface generated by the local version of the application based on at least one of the subsequent user events; and
storing data identifying the one or more subsequent user events.

17. The system of claim 16, wherein the operations further comprise:
determining that data communication between the data processing apparatus and the remote application system has been reestablished; and
in response, providing the stored data to the remote application system, wherein the application executed by the remote application system processes the user events in an order in which the user events occurred until the application executed by the remote application system is synchronized with the local version of the application.

18. The system of claim 17, wherein the operations further comprise:
determining that the application executed by the remote application system has synchronized with the local version of the application based, at least in part, on the application processing the one or more subsequent user events;

detecting a new user event associated with the application after the application has synchronized with the local application;

providing, to the remote application system, data identifying the new user event;

receiving, from the remote application system, new user interface data representing a new user interface generated by the application executed by the remote application system based on the new user event; and presenting the new user interface on the display.

19. The system of claim 16, wherein the operations further comprise, while data communication is available between the data processing apparatus and the remote application system, providing first user interfaces generated by the local version of the application to an off-screen buffer rather than presenting the first user interfaces on the display.

20. The system of claim 16, wherein the application comprises a respective user interface code path corresponding to each of a plurality of user device classes, and wherein each user interface code path, when executed, generates a user interface that is specific to user devices of the corresponding user device class.

\* \* \* \* \*